(12) United States Patent
Tumpold

(10) Patent No.: US 11,604,171 B2
(45) Date of Patent: Mar. 14, 2023

(54) FLUID SENSOR

(71) Applicant: Infineon Technologies AG, Neubiberg (DE)

(72) Inventor: David Tumpold, Kirchheim b München (DE)

(73) Assignee: Infineon Technologies AG, Neubiberg (DE)

( * ) Notice: Subject to any disclaimer, the term of this patent is extended or adjusted under 35 U.S.C. 154(b) by 156 days.

(21) Appl. No.: 17/191,212

(22) Filed: Mar. 3, 2021

(65) Prior Publication Data

US 2021/0349057 A1    Nov. 11, 2021

(30) Foreign Application Priority Data

May 7, 2020 (EP) .................................... 20173424

(51) Int. Cl.
    *G01N 29/24*      (2006.01)
    *G01N 29/036*     (2006.01)

(52) U.S. Cl.
    CPC ....... *G01N 29/2425* (2013.01); *G01N 29/036* (2013.01); *G01N 2291/021* (2013.01)

(58) Field of Classification Search
    CPC ........... G01N 29/2425; G01N 29/2418; G01N 29/036; G01N 2291/021; G01N 2021/1704; G01N 21/1702; G01N 21/35; G01N 25/00; G01H 17/00

See application file for complete search history.

(56) References Cited

U.S. PATENT DOCUMENTS

| | | | | |
|---|---|---|---|---|
| 6,474,168 | B1* | 11/2002 | Meringdal | G01N 21/1702 73/861.47 |
| 8,342,005 | B2 | 1/2013 | Kotovsky et al. | |
| 9,995,674 | B2* | 6/2018 | Prasad | G01N 29/46 |
| 11,137,376 | B2* | 10/2021 | Eberl | G01N 29/2425 |
| 2011/0016962 | A1 | 1/2011 | DiFoggio | |
| 2015/0247877 | A1* | 9/2015 | Kanemoto | G01P 3/44 73/504.04 |
| 2016/0282313 | A1 | 9/2016 | Robinson | |

FOREIGN PATENT DOCUMENTS

EP      2543987 A1    1/2013

\* cited by examiner

*Primary Examiner* — Suman K Nath
(74) *Attorney, Agent, or Firm* — Slater Matsil, LLP

(57) ABSTRACT

A fluid sensor includes a housing structure forming a cavity for an IR emitter for emitting an IR radiation in the cavity, wherein the IR radiation has a center wavelength for providing an interaction of the IR radiation with the target fluid resulting in a temperature change in the cavity or in the housing structure, which effects a mechanical pulse in the housing structure, and an inertial detection sensor mechanically coupled to the housing structure for sensing the mechanical pulse in the housing structure.

19 Claims, 5 Drawing Sheets

FLUID SENSOR

This application claims the benefit of European Patent Application No. 20173424, filed on May 7, 2020, which application is hereby incorporated herein by reference.

TECHNICAL FIELD

Embodiments of the present disclosure relate to the field of fluid sensors, such as gas or liquid sensors. More specifically, embodiments relate to the field of an acceleration sensor based PAS system and, in particular, to a photoacoustic sensor using an acceleration sensor or an inertial sensor or a resonant sensor to pick up sound or mechanical pulses, e.g. vibrations.

BACKGROUND

The sensing of environmental parameters in the ambient atmosphere, such as noise, sound, temperature and gases, e.g. environmental gas components, gains more and more importance in the implementation of appropriate sensors within mobile devices, home automation, such as smart home, and the automotive sector. Harmful gas concentrations can occur due to air pollution and/or a malfunction of certain electric or electronic devices. However, the well-being of a person or animal is strongly influenced by the air quality. Thus, the gas detection and gas evaluation in the environmental atmosphere by inexpensive, always available and connected sensors is an upcoming topic in the future. However, with the evermore extensive use of sensors, there is also a particular need to be able to produce such sensors as inexpensively as possible and, thus, cost effectively. However, the resulting reliability and accuracy of the sensors should nevertheless be maintained or even increased.

In particular, the field of monitoring the air quality in our environment gets more and more attention. A typical optical sensor, e.g., a photoacoustic sensor (PAS), comprises a radiation source, filter elements for a wavelength selection, a detector and the sample area where the light between the light source and the detector interacts with the environmental medium.

In this field, open or closed photoacoustic sensors are used. Open photoacoustic sensors use a resonant method to detect the gas concentrations or use the detector membrane directly to adjust gas diffusion and separate measurement cavity from environment. Closed photoacoustic sensors mostly use a reference cell filled with a target gas, where these reference cells are separated usually from the detector via an absorption path in which the concentration is determined. PAS sensors generate acoustic waves and detect the time varying amplitude via acoustic transducers such as microphones.

Generally, there is a need in the field for an approach to implement a fluid sensor having reduced fabrication requirements and providing an adequate sensitivity for the target fluid to be detected by the fluid sensor device.

Such a need can be solved by the fluid sensor according to claim 1. Further, specific implementations of the fluid sensor are defined in the dependent claims.

SUMMARY

According to an embodiment, a fluid sensor comprises a housing structure forming a cavity for a target fluid component, an IR emitter optically coupled to the housing structure and configured for emitting an IR radiation in the cavity, wherein the IR radiation has a center wavelength for providing an interaction of the IR radiation with a target fluid resulting in a temperature change in the cavity or in the housing structure which effects a mechanical pulse in the housing structure, and an inertial detection sensor mechanically coupled to the housing structure for sensing the mechanical pulse in the housing structure.

According to an embodiment, the interaction of the IR radiation with the target fluid is an absorption of the IR radiation by the target fluid, and wherein the absorption of the IR radiation by the target fluid results in the temperature change of the target fluid and consequently in a pressure change in the cavity, which effects the mechanical pulse in the housing structure. Consequently, the amplitude of the mechanical pulse(s) in the housing structure is directly proportional to the absorption of the IR radiation by the target fluid. Thus, the output signal of the inertial detection sensor is directly proportional to the absorption of the IR radiation by the target fluid and the fluid sensor has a PAS sensor functionality (PAS=Photo Acoustic Spectrometer).

According to an embodiment, the interaction of the IR radiation with the target fluid is an absorption of the IR radiation by the target fluid, which results in the temperature change or thermal pulse in the housing structure, wherein a heating of the housing structure and the amplitude of the resulting mechanical pulse(s) in the housing structure is inversely proportional to the absorption of the IR radiation by the target fluid. Thus, the output signal of the inertial detection sensor is inversely proportional to the absorption of the IR radiation by the target fluid and the fluid sensor has a NDIR sensor functionality (NDIR=non-dispersive IR).

According to an embodiment, a fluid sensor comprises a housing structure forming a cavity, an inertial detection sensor, wherein a part of the inertial detection sensor forms a radiation receiving section, and an IR emitter optically coupled to the housing structure and configured for emitting an IR radiation in the cavity, wherein the IR radiation has a center wavelength $\lambda_0$ for providing an interaction of the IR radiation with a target fluid resulting in a temperature change in the radiation receiving section of the inertial detection sensor, which effects a mechanical pulse in the inertial detection sensor, wherein the inertial detection sensor is arranged for sensing the mechanical pulse.

BRIEF DESCRIPTION OF THE DRAWINGS

In the following, embodiments of the present disclosure are described in more detail with reference to the figures, in which.

Figure 1:
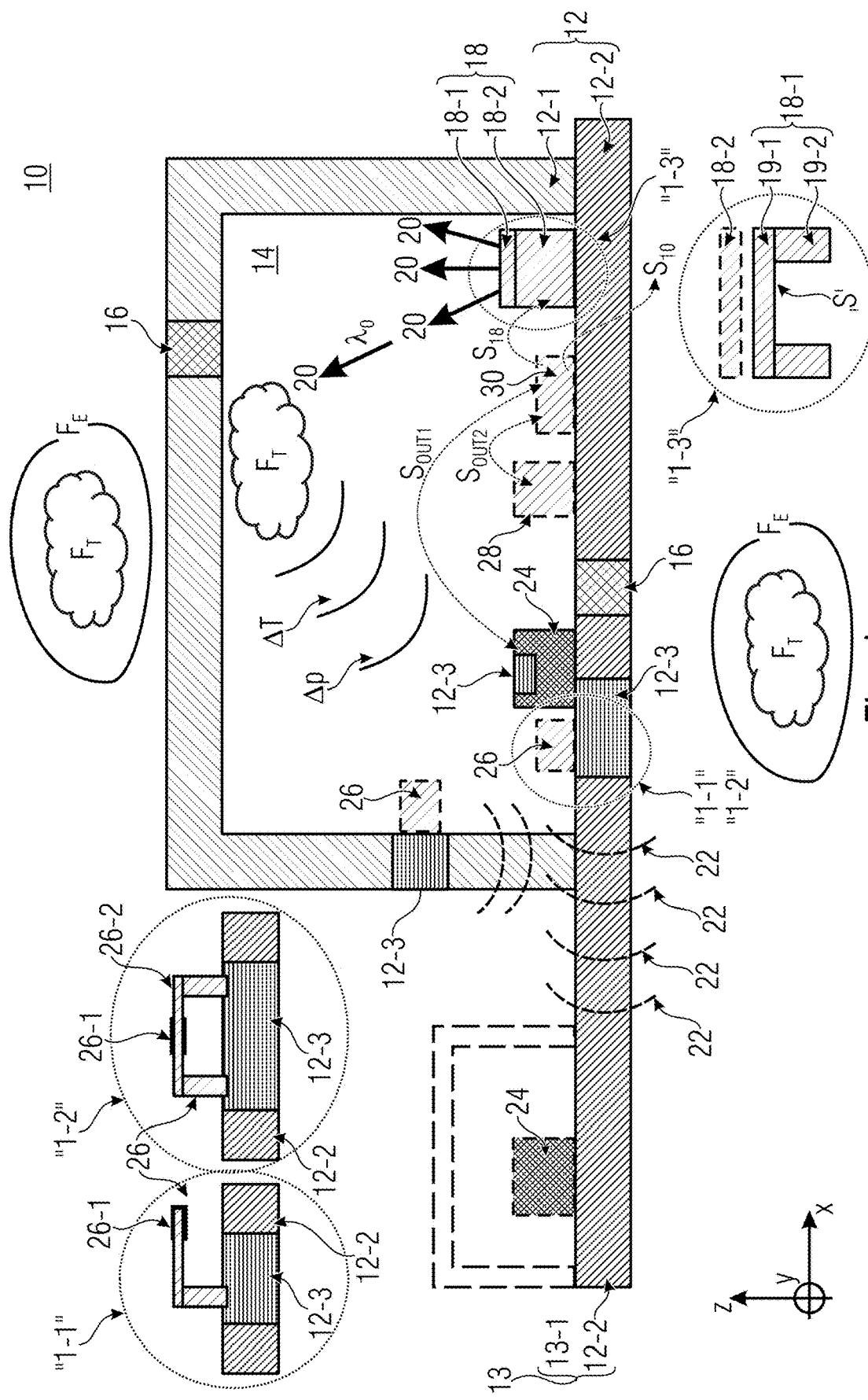
FIG. 1 shows a schematic cross-sectional view of a fluid sensor according to an embodiment.

Before discussing the present embodiments in further detail using the drawings, it is pointed out that in the figures and the specification identical elements and elements having the same functionality and/or the same technical or physical effect are usually provided with the same reference numbers or are identified with the same name, so that the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, the figures comprise a Cartesian coordinate system x, y, z, wherein the x-y-plane corresponds, i.e. is parallel, to a first main surface region of a substrate (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction, i.e. parallel to the x-y-plane, wherein the term "vertical" means a direction parallel to the z-direction. In FIGS. 1 to 5, the drawing plane is parallel to the x-z-plane.

FIG. 1 shows a fluid sensor 10 according to an embodiment. According to an embodiment, the fluid sensor 10 comprises a housing structure (or package) 12. The housing structure 12 forms a cavity 14. The fluid sensor 10 further comprises an IR emitter 18 optically coupled to the housing structure 12 and configured for emitting an IR radiation 20 in the cavity 14, wherein the IR radiation 20 has a center wavelength $\lambda_0$ for providing an interaction of the IR radiation 20 with a target fluid $F_T$ resulting in a temperature change $\Delta T$ in the cavity 14 or in the housing structure 12 which effects a mechanical pulse 22 in the housing structure 12. The fluid sensor 10 further comprises an inertial detection sensor 24 mechanically coupled to the housing structure 12 for sensing the mechanical pulse in the housing structure 12.

The housing structure 12 may comprise a lid element 12-1 and a substrate 12-2, which are mechanically bonded. As exemplarily shown in FIG. 1, the IR emitter 18 may be arranged inside the cavity 14. According to further embodiments below, the R emitter 18 may be also arranged outside the cavity 14. Thus, the IR emitter 18 optically coupled to the housing structure 12 and is configured to emitting an IR radiation 20 in the cavity 14, wherein the IR radiation 20 has a center wavelength $\lambda_0$ for providing an interaction, e.g. an absorption, of the IR radiation 20 with the target fluid component $F_T$ resulting in a temperature change $\Delta T$ of the fluid atmosphere in the cavity 14 or resulting in a temperature change $\Delta T$ in at least a part 12-3 of the housing structure 12. Such a temperature change $\Delta T$ of the fluid atmosphere in the cavity 14 or of at least a part of the housing structure 12 effects or results in a mechanical pulse 22 in the housing structure 12. The fluid sensor 10 further comprises an inertial detection sensor 24, e.g., an accelerometer or a gyroscope etc., mechanically coupled to the housing structure 12 for sensing the mechanical pulse(s) 22 in the housing structure 12. Thus, embodiments provide a photoacoustic sound pickup via the inertial detection sensor 24, such as an accelerometer.

According to an embodiment, the fluid sensor 10 is arranged for sensing an amount or a concentration of a target fluid or a target fluid component $F_T$ in the surrounding atmosphere $F_E$, e.g. an environmental medium. In the present context, the term fluid may relate to a liquid or a gas. In case, the environmental medium relates to environmental air, the target fluid may relate to a target gas or target gas component $F_T$ which is present in the environmental air (=environmental atmosphere) $F_E$. The present concept is equally applicable to sensing a target liquid or a target liquid component $F_T$ in the environmental medium $F_E$, an environmental gas or environmental liquid. In this context, gases and liquids are collectively referred to as fluids.

According to embodiments, a mechanical pulse or structural pulse 22 may be regarded as a local, mechanical or structural deformation of at least a region of the housing structure 12, wherein the mechanical pulse 22 is propagating or spreading in the housing structure 12. Thus, the mechanical pulse 22 may propagate or spread as structure-borne sound or solid-borne sound in the housing structure 12. A plurality or a series of mechanical pulses 22 may also be regarded as a mechanical vibration.

According to an embodiment, the inertial detection sensor 24 may comprise an accelerometer configured to provide a detector output signal $S_{OUT1}$ based on an amplitude of the mechanical pulse 22 in the housing structure 12 which is received by the inertial detection sensor 24 mechanically coupled to the housing structure 12. The accelerometer 24 may comprise, for example, a piezo-electrical sensor structure and/or a capacitive sensor structure for sensing the mechanical pulse 22 in the housing structure 12.

Primary effect: As outlined above, the interaction of the IR radiation 20 with the target fluid or target fluid component $F_T$ in the cavity 14 may result (as a first effect) in a temperature change $\Delta T$ of the fluid atmosphere in the cavity 14. Due to the interaction of the IR radiation 20 with the target fluid $F_T$, molecules of the target fluid $F_T$ absorb light (=IR radiation 20) and generate a pressure pulse $\Delta P$ in the cavity 14 as a consequence of the temperature change $\Delta T$ of the fluid atmosphere in the cavity 14. The pressure pulse $\Delta P$ is transformed into a structural pulse or vibration 22 in the housing structure 12 and a signal pickup in form of a pressure pulse (=sound) detection is realized with the inertial sensor 24, e.g. an accelerometer.

This effect may be regarded as a first (primary) measurement effect, wherein the interaction of the IR radiation 20 with the target fluid $F_T$ is an absorption of the IR radiation 20 by the target fluid $F_T$, and wherein the absorption of the IR radiation 20 by the target fluid $F_T$ results in the temperature change $\Delta T$ of the target fluid $F_T$ and, consequently, in a pressure change ΔP in the cavity 14, which effects the mechanical pulse 22 in the housing structure 12.

The implementation of measurement (=measurement setup) for sensing the primary effect may require a relatively "closed" housing 12 for generating the pressure pulse(s) in the cavity 14, as the pressure pulses ΔP are proportional or directly proportional to the concentration of target fluid $F_T$ in the fluid atmosphere $F_E$ in the cavity 14. Consequently, the amplitude of the mechanical pulse(s) 22 in the housing structure 12 or in the inertial detection sensor 24 is directly proportional to the absorption of the IR radiation 20 by the target fluid. Thus, the output signal $S_{OUT1}$ of the inertial detection sensor 24 is directly proportional to the absorption of the IR radiation 20 by the target fluid $F_T$ and the fluid sensor 10 has a PAS sensor functionality (PAS=Photo Acoustic Spectrometer).

According to the embodiment of FIG. 1, the housing structure 12 may comprise a fluid access 16 to the cavity 14 for an environmental fluid $F_E$ comprising the target fluid component $F_T$. Thus, the fluid access 16 for the environmental fluid "$F_E$" may be arranged for providing a fluid exchange between the environment of the fluid sensor 10 and the cavity 14 of the fluid sensor 10, wherein the fluid access 16 may be arranged to act like a low-pass filter for the pressure pulse(s) ΔP in the cavity 14 with respect to the environment, i.e. fast pressure changes ΔP in the cavity 14 with respect to the environment are essentially maintained in the cavity 14 and slow pressure changes ΔP in the cavity 14 with respect to the environment can be leveled out with the environment.

Secondary effect: As outlined above, the interaction of the IR radiation 20 with the target fluid component $F_T$ may result (as a second effect) in a temperature change ΔT of at least a part 12-3 of the housing structure 12 or a part of the inertial detection sensor 24 which effects the mechanical pulse 22 in the housing structure 12 or in the inertial detection sensor 24, respectively. This further measurement effect of the interaction of the IR radiation 20 with the target fluid $F_T$ in the cavity 14 is an absorption of the IR radiation by the target fluid $F_T$, which results in the temperature change ΔT (=thermal pulse) in the housing structure 12, i.e. in at least a portion of housing structure 12 or the complete housing structure 12. A local heating of the housing structure 12 is inversely proportional to the absorption of the IR radiation 20 by the target fluid $F_T$ in the cavity 14. The heating of the housing structure 12 by the IR radiation 20 is reduced by the amount of IR radiation absorption of the target fluid $F_T$.

To be more specific, the higher the concentration of the target fluid $F_T$ is in the cavity 14, the lower is the (local) heating of the housing structure 12 by the IR radiation 20 due to the amount of IR radiation absorption of the target fluid $F_T$. Thus, the local heating and the resulting thermal pulse(s) 22 of the housing structure 12 is a measure of the concentration the target fluid $F_T$ in the environmental fluid $F_E$, as temperate change ΔT is inversely proportional to the absorption of the IR radiation 20 by the target fluid $F_T$ in the cavity 14.

As exemplarily shown in FIG. 1, the cavity 14 may be arranged for providing an optical interaction path for an interaction of the narrowband electromagnetic radiation 20 having a center wavelength $\lambda_0$ with the target fluid $F_T$ in the cavity 14. A part of the housing structure 12 or a part of the inertial detection sensor 24 may form a radiation receiving region 12-3. As the heating of the housing structure 12 by the IR radiation 20 is reduced by the amount of IR radiation absorption of the target fluid $F_T$, an inner part of the housing structure 12, e.g. of the lid 12-1 or the substrate 12-2, or a part of the inertial detection sensor 24 may form the radiation receiving section 12-3.

As exemplarily shown in FIG. 1, the radiation receiving region 12-3 may be provided in or on the housing structure 12, i.e. in or on at least one of the lid 12-1 and the substrate 12-2. As further shown in FIG. 1, the radiation receiving region 12-3 may be optionally a part of an inertial detection sensor 24 itself, e.g. a surface region of an inertial detection sensor 24 in the cavity 14 (if the inertial detection sensor 24 is provided inside the package 12). Thus, the radiation receiving region 12-3 is arranged inside the package 12, which surrounds the cavity 14, and in or on the lid 12-1, in or on the substrate 12-2, and/or in or on the inertial detection sensor 24.

Based on a IR radiation 20 induced heating, the radiation receiving portion 12-3 may provide the thermally induced mechanical pulse 22 based on a signal strength of the narrowband electromagnetic radiation 20 having traversed the optical interaction path P in the cavity 14, and being received by the radiation receiving portion 12-3. The heating of the radiation receiving portion 12-3 of the housing structure 12 or of the inertial detection sensor 24 is inversely proportional to the absorption of the IR radiation 20 by the target fluid $F_T$ in the cavity 14. Consequently, the amplitude of the induced mechanical pulse(s) 22 in the housing structure 12 or in the inertial detection sensor 24 is inversely proportional to the absorption of the IR radiation 20 by the target fluid. Thus, the output signal $S_{OUT1}$ of the inertial detection sensor 24 is inversely proportional to the absorption of the IR radiation 20 by the target fluid $F_T$ and the fluid sensor 10 has a NDIR sensor functionality (NDIR=nondispersive IR).

Due to the interaction of the IR radiation 20 with the target fluid $F_T$, molecules of the target fluid $F_T$ absorb light (=IR radiation 20) and generate a thermal pulse ΔP in the material of the housing structure 12 or in the inertial detection sensor 24 as a consequence of the temperature change ΔT of the radiation receiving section 12-3. Thus, the thermal energy is transformed into a structural deformation, e.g. a local structural deformation, and/or into a structural pulse or vibration in the housing structure 12 or in the inertial detection sensor 24 and a signal pickup in form of a pressure pulse detection is realized with the inertial sensor 24, e.g. an accelerometer.

The implementation of measurement (=measurement setup) for sensing the secondary effect may require a relatively "open" housing 12 for generating the thermal pulse(s) in the housing structure 12 or in the inertial detection sensor 24 and for "avoiding" the pressure pulse(s) in the cavity 14, as thermally induced mechanical pulse(s) in the housing structure 12 is (are) inversely proportional to the concentration of target fluid $F_T$ in the fluid atmosphere $F_E$ in the cavity 14.

Thus, the fluid access 16 for the environmental fluid "$F_E$" may be arranged for providing a relatively "free" fluid exchange between the environment of the fluid sensor 10 and the cavity 14 of the fluid sensor 10, i.e. slow and fast pressure changes ΔP in the cavity 14 with respect to the environment can be immediately leveled out with the environment, wherein pressure pulses ΔP in the cavity 14 can be essentially avoided.

According to the embodiments (of the primary effect and secondary effect), the housing structure 12 may comprise the access 16 to the cavity 14 in form of a fluid inlet or fluid opening 16. Thus, the cavity 14 may be accessible through the fluid inlet 16 for an environmental fluid "$F_E$" comprising a target fluid or target fluid component "$F_T$". According to an embodiment, the access 16 to the cavity 14 may also comprise a perforated material as well as other structures, e.g., a diffusor, or even more complex structures such as a fluid valve or fluid pump. A diffusor 16 may comprise a perforated fluid permeable membrane and a reinforcement structure mechanically being coupled with the perforated membrane for mechanically stiffening and/or stabilizing the perforated membrane (120). The fluid diffusion in the cavity 14 and the acoustic suppression (e.g. acoustic noise suppression) can be adjusted by the access 16 to the housing structure 12, i.e. by the structural feature 16 allowing the access of an environmental fluid $F_E$ to the cavity 14.

According to an embodiment, the housing structure 12 may comprises a mechanical pulse amplification structure 26 at or adjacent to the radiation receiving section 12-3 of the lid 12-1, the substrate 12-2 or both, the lid 12-1 and the substrate 12-2. The mechanical pulse amplification structure 26 may have at least one of a cantilever element, a bi-metal structure, membrane element or any other sensitive vibrational structure for providing a mechanical amplification of the mechanical pulse 22, i.e. of the amplitude of the mechanical pulse 22, in the housing structure 12.

The enlarged region "1-1" of FIG. 1 shows an exemplary mechanical pulse amplification structure 26 in form of the cantilever element, e.g. with a (small) artificial mass 26-1 on the cantilever for increasing the mechanical amplification of the mechanical pulse 22.

The enlarged region "1-2" of FIG. 1 shows an exemplary mechanical pulse amplification structure 26 in form of a membrane based resonator element. The mechanical pulse amplification structure (=acceleration sensor) 26 may be implemented as a MEMS microphone, e.g. with a (small) artificial mass 26-1 on the membrane 26-2 for increasing the mechanical amplification of the mechanical pulse 22.

The amplification of the mechanical pulse 22 in the housing structure 12 may be a conversion of the temperature change $\Delta T$ (=thermal pulse) in the housing structure 12 in an amplified mechanical pulse 22' having an increased amplitude when compared to an amplitude of an unamplified (thermally induced) mechanical pulse 22. Such an amplified mechanical pulse 22' is an easier detectable mechanical measure or physical quantity resulting from the temperature change $\Delta T$ in (the radiation receiving section 12-3 of) the housing structure 12. The amplification of the mechanical pulse 22 depends on the temperature change $\Delta T$ of the housing structure 12 or of the region 12-3 of the housing structure 12, which is thermally coupled to the mechanical vibration amplification structure 26.

According to a further embodiment, the mechanical amplifier 26 can be a structure following the law of levers, see for example the cantilever element 26 as shown in the enlarged region "1-1" of FIG. 1. It can also be a structure which is coupled with incompressible materials following Newtown's law, like the piston pressure law, for example. For a fast transient effect the coupling material can be assumed as incompressible by taking advantage of its inertial force features. An implementation can be a large membrane sensing the vibrations or pressure changes and is coupled to the sensor device 10 with a closed volume but with a smaller opening towards the sensor 10. If the liquid is incompressible or low compressible, the sensing membrane surface increases the signal with respect to the detection opening with inverse characteristics. See for example the membrane based resonator element 26 as shown in the enlarged region "1-2" of FIG. 1.

Alternatively, the mechanical pulse(s) or vibrations 22 can also be amplified by law of levers, where the force is inversely proportional to the displacement. Alternatively resonant structures can be used, such as mass spring dampers, e.g. levers, pillars, membranes, etc. According to embodiments, mechanical amplification structures 26, e.g. levers, may be used for amplifying the mechanical pulse(s) or vibrations 22. Moreover, small (=fast) bi-metal elements may be also used as an oscillator for the mechanical amplification structures 26.

According to an embodiment, the emitter structure 18 may be configured to emit electromagnetic radiation 20, e.g. thermal radiation, in a specific wavelength spectrum into the cavity 14. The wavelength $\lambda_0$ of the emitted narrowband electromagnetic (e.g. thermal) radiation 20, e.g. a narrowband thermal radiation, may depend on the fluid to be detected, i.e. the target fluid $F_T$ in the environmental atmosphere.

In case, a the target gas $F_T$ is to be detected, the target gas $F_T$ may comprise carbon monoxide CO, carbon dioxide $CO_2$, ozone $O_3$, nitrogen oxide $NO_x$, methane $CH_4$, etc., for example. However, this list of target gases $F_T$ to be detected is not to be regarded as exhaustive. In case, a the target liquid $F_T$ is to be detected, the target liquid $F_T$ may comprise carbon monoxide CO, carbon dioxide $CO_2$, methane $CH_4$, ethanol, nitrogen dioxide $NO_2$, formaldehyde $CH_2O$, and/or water vapor $H_2O$. However, this list of target liquids to be detected is not to be regarded as exhaustive.

The environmental medium $F_E$ may an environmental gas, e.g. environmental air or any gas atmosphere, or an environmental liquid, e.g. water in general, tap water or any liquid.

According to an embodiment, the emitter structure 18 may be configured to intermittently or periodically emit the narrowband electromagnetic radiation 20. The emitter structure 18 may also comprise a thermal source and/or an infrared source 18-1 and, optionally, a wavelength selective structure 18-2 configured for providing the narrowband electromagnetic radiation 20, e.g. the IR radiation pulse(s) 20 having the center wavelength $\lambda_0$. Accordingly, the environmental fluid $F_E$, e.g. an environmental gas or liquid, inside the cavity 14, including the target fluid $F_T$, e.g. the target gas or target liquid, absorbs the emitted electromagnetic radiation 20, wherein this absorption of the fluid may produce a change, e.g. an increase, of temperature T in the cavity 14 or in the housing structure 12 which effects the mechanical pulse(s) or vibration 22 in the housing structure 12.

The amount of absorption of the emitted thermal radiation 20 by the target fluid $F_T$ and the related mechanical pulse(s) inside the housing structure 12 may depend on the sort and the amount of the target fluid inside the cavity 14 and may vary with the target fluid $F_T$ and its concentration. The emitter structure 18 is arranged in the cavity 14 or is optically coupled to the cavity 14.

In the present description, infrared radiation (IR) is mentioned as one non-limiting example of a thermal radiation. Thermal radiation may be any radiation above absolute zero starting at 0° Kelvin. Infrared radiation may be a particular part of a thermal radiation in general. Additionally, radiation source is mentioned and may comprise at least one of an infrared radiation source, a light emitting diode (LED), a laser source and/or a thermal source (thermal emitter).

The enlarged region "1-3" of FIG. 1 shows an exemplary IR emitter structure 18. According to an embodiment, the IR emitter structure 18 may be formed as a thermal emitter (=IR source) comprising a freestanding membrane 19-1 supported by an emitter substrate 19-2, wherein the freestanding membrane 19-1 comprises a conductive center section "S" which may be arranged on or embedded in the freestanding membrane 19-1 and may be arranged on a emitter cavity 19-3 in the emitter substrate 19-2.

The (optional) wavelength selective structure 18-2 is arranged for filtering a broadband IR radiation λ emitted by the thermal emitter 18-1 and for emitting the narrowband IR radiation 20 into the cavity 14. Thus, the wavelength selective structure (IR filter) 18-2 is configured for providing the narrowband IR radiation 20 having the center wavelength $\lambda_0$, which falls in the absorption spectrum of the target fluid component $F_T$, for example. The wavelength selective structure 18-2 may be formed as an IR filter, e.g. as a Fabry-Perot filter element, or as a plasmonic structure, e.g. as a plasmonic resonator for the emitted IR radiation.

According to an embodiment, the inertial detection sensor 24, e.g., an accelerometer or a gyroscope etc., is mechanically coupled or bonded to the housing structure 12 for sensing the mechanical pulse(s) 22 in the housing structure 12. The inertial detection sensor 24 may comprise a suspended mechanical sensor structure which has a mechanical resonance frequency in the range between 5 Hz and 25 kHz or between 5 and 100 Hz. The suspended mechanical sensor structure which is deflectable with respect to the mechanical pulse 22 in the housing structure 12 may have a mechanical resonance frequency, for example, in the frequency range of the time varying or pulsed IR radiation 20 of the infrared source 18 or in the frequency range of the harmonics created by the time varying or pulsed IR radiation 20 of the infrared source 18.

According to an embodiment, a MEMS microphone may be used as the acceleration sensor 24, wherein the resonance of MEMS microphone is higher than be frequency range of the time varying or pulsed IR radiation 20 of the infrared source 18 or in the frequency range of the harmonics thereof but a MEMS microphone can still be used to pick-up mechanical vibrations in a wide frequency range, e.g. between 5 Hz and 25 kHz. The MEMS microphone is also able to detect acoustic information, hence it is able to sense "wide" frequency spectra.

According to an embodiment, the housing structure 12 comprises the lid structure 12-1 which is mechanically coupled or bonded to a substrate or basis element 12-2, wherein the inertial detection sensor 24 is mechanically coupled to the lid structure 12-1 and/or the substrate 12-2. The inertial detection sensor 24 is arranged at a position of the housing structure 12, which allows a reception and detection the mechanical pulse 22 in the housing structure 12. Thus, the inertial detection sensor 24 may be arranged at a position of the housing structure 12, which provides a comparatively high amplitude of the mechanical pulse 22, when compared to other portions of the housing structure 12.

As exemplarily shown in FIG. 1 as optional locations, the inertial detection sensor 24 may be arranged at the housing structure 12 inside or outside the cavity 14. In case, the inertial detection sensor 24 is arranged outside the cavity 14, an additional housing structure 13, which comprises the substrate 12-2 and a further lid structure 13-1, which is mechanically coupled or bonded to a substrate or basis element 12-2, may be provided for covering the inertial detection sensor 24.

According to an embodiment, the IR source 18 and the inertial detector 24 may be part of the same physical device surrounded by the housing structure 12. In case, the fluid sensor 10 is part of a module, e.g. a higher-lever assembly, an additional housing surrounding the module may be additionally provided.

According to an embodiment, the fluid sensor may optionally comprise a differential pressure sensor 28, e.g. a MEMS microphone, arranged in the cavity 14 of the housing structure 12 to provide a further detector output signal $S_{OUT2}$ based on the pressure change ΔP generated in the cavity 14 of the housing structure 12 by means of the IR radiation 20. Thus, the pressure variations ΔP may be additionally detected by the acoustic transducer 28, for example a MEMS microphone inside the cavity or PAS volume 14, so that the differential pressure sensor 28 may form a PAS sensor (PAS Photo Acoustic Spectrometer).

According to an embodiment, fluid sensor 10 may comprise the inertial detection sensor 24 which is mechanically coupled to the housing structure and, additionally, the acoustic transducer 28, for example, a MEMS microphone. According to an embodiment, the thermal emitter 18 and the acoustic transducer 28 are arranged inside the mutual measurement cavity 14. According to a further embodiment, the thermal emitter 18, the inertial sensor 24 and the acoustic transducer 28 are arranged inside the mutual measurement cavity 14.

According to an embodiment, the fluid sensor may optionally comprise a processing circuit or controller 30 for providing a time varying or pulsed excitation signal $S_{18}$ to the IR emitter 18 and for reading out and, optionally, processing the respective output signal(s) $S_{OUT1}$ of the inertial detection sensor(s) 24 and for providing a fluid sensor output signal $S_{10}$ having an information on the concentration of the target fluid component $F_T$ in the environmental fluid $F_E$ in the cavity 14 of the housing structure 12. The processing circuit 30 may be formed by an ASIC (ASIC=application specific integrated circuit).

Based on time varying or pulsed excitation signal $S_{18}$ from the processing circuit 30, the IR emitter 18 is configured for emitting the IR radiation 20 in a pulsed way into the cavity 14 and for effecting the mechanical pulse(s) or vibration 22 in the housing structure 12.

The processing circuit 30 may be also configured for reading out and, optionally, processing the output signal(s) $S_{OUT2}$ of the respective differential pressure sensor(s) 28 for providing the fluid sensor output signal $S_{10}$ having an information on the concentration of the target fluid component $F_T$.

According to an embodiment, the processing circuit 30 may be configured for providing the fluid sensor output signal $S_{10}$ having an information on the concentration of the target fluid component $F_T$ based on a combination and processing of output signal(s) $S_{OUT1}$ of the inertial detection sensor(s) 24 and the output signal(s) $S_{OUT2}$ of the respective differential pressure sensor(s) 28. Thus, a reliable fluid sensor output signal $S_{10}$ can be achieved as the fluid detection is based on two different physical effects and associated measurement principles.

According to the above embodiments, the fluid sensor 10, e.g. a photo-acoustic sensor (PAS), may be based on MEMS technology and may comprise of the chopped MEMS infrared emitting heater 18-1, the inertial sensor 24, an (optional) optical filter 18-2 for wavelength selective heating and a housing 12. The system 10 may be operated by the internal ASIC 30, which provides the heater (emitter) chopper signal, e.g. current, $S_{18}$ and the structural vibration readout of the output signal(s) $S_{OUT1}$ of the inertial detection sensor(s) 24 and, optionally, of the output signal(s) $S_{OUT2}$ of the differential pressure sensor(s) 28.

The signal connections between the processing circuit 30 and inertial sensor(s) 24, the optional differential pressure sensor 28 and the thermal emitter 18 are only principally illustrated in FIG. 1.

The core of the present concept can be seen in bringing a MEMS inertial (acceleration) sensor 24 together with a selective infrared source 18, e.g. an infrared heater 18-1 and the optical filter 18-2, e.g. in a single (the same) housing 12 or in shared (e.g. two or more) housings 12, 13.

Thus, embodiments of the present fluid sensor 10 allow for an accurate and real time fluid detection and evaluation of the environmental atmosphere $F_E$, i.e. an efficient monitoring of the environmental air condition and a fast detection of air pollution, for satisfying growing health concerns. Moreover, the fluid sensor 10 also provides a significant potential for energy efficiency in buildings, e.g. for HVAC systems (HVAC=Heating, Ventilation and Air Conditioning).

Figure 2:
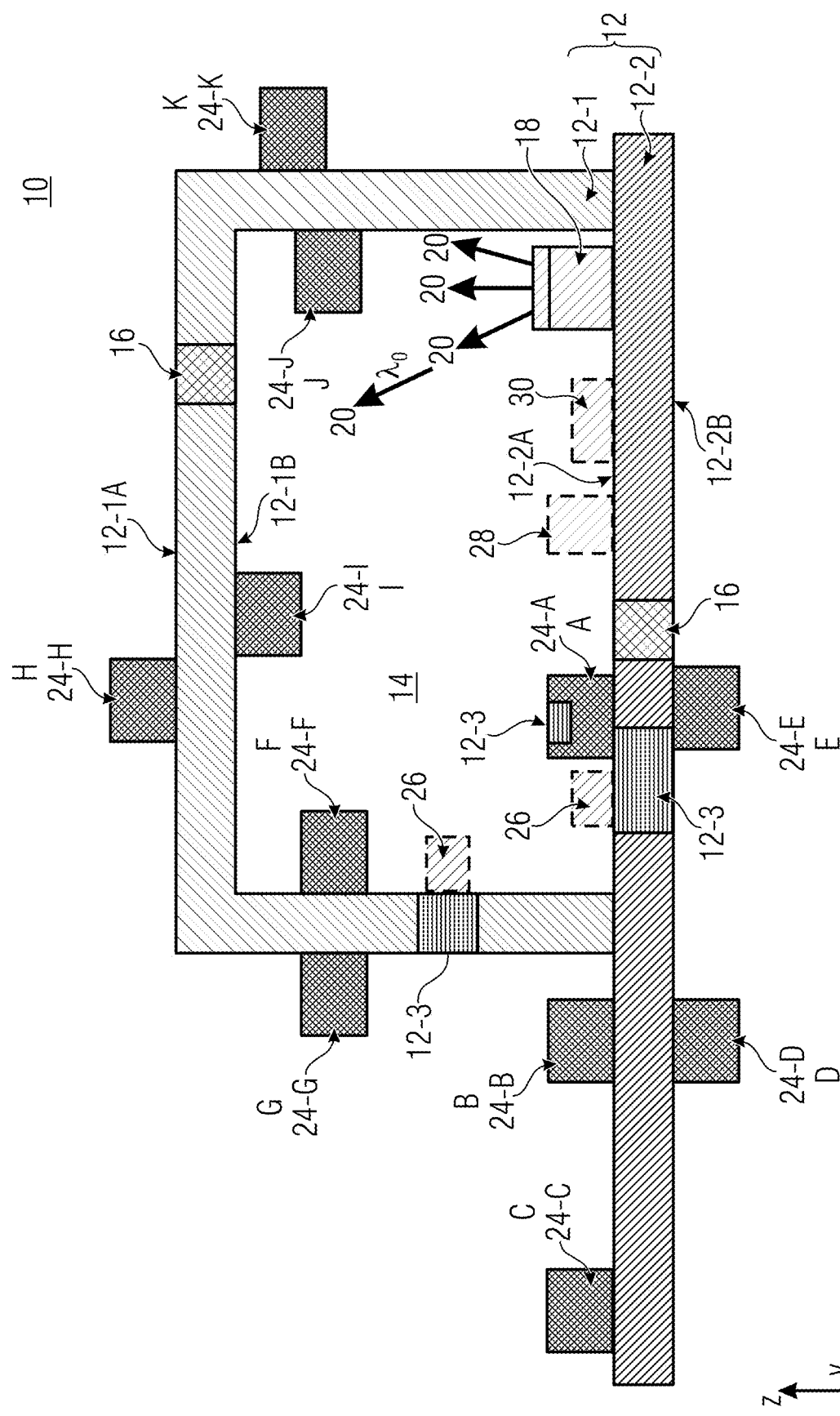
FIG. 2 shows a schematic cross-sectional view of a fluid sensor according to a further embodiment.

FIG. 2 shows a schematic cross-sectional view of a fluid sensor 10 according to a further embodiment. The above evaluations in connection to FIG. 1, which relate to the structure and functionality of the fluid sensor 10, are equally applicable to the fluid sensors 10 of FIG. 2. The illustration of the fluid sensor 10 in FIG. 2 differs from the illustration of the fluid sensor 10 in FIG. 1 in that a plurality of optional and exemplary locations A-K for placing the at least one inertial detection sensor 24 are depicted. To be more specific, the fluid sensor 10 may comprise a plurality of the inertial detection sensors 24 (24-A=sensor 24 at optional position A, . . . , 24-K=sensor 24 at optional position K) which are mechanically coupled to the housing structure 12 for sensing the mechanical pulse 20 in the housing structure 12.

The inertial detection sensors 24 are arranged or distributed at different positions of the housing structure 12, which allow a reliable reception and detection of the mechanical pulse(s) 22 propagating in the housing structure 12. When compared to the illustration of FIG. 2, the inertial detection sensors 24 may also be distributed at different positions on the housing structure 12 with respect to the z-direction (=vertically distributed) or with respect to the y- or x-direction (laterally distributed) for reliably sensing the mechanical pulse(s) 22.

According to an embodiment, at least one of the inertial detection sensors 24 may be arranged at the housing structure 12 within the cavity 14. Additionally or alternatively, at least one of the inertial detection sensors 24 may be arranged at the housing structure 12 outside the cavity 14.

According to an embodiment, at least one of the inertial detection sensors 24 may be arranged at the housing structure 12 within the cavity 14, wherein at least one of the inertial detection sensors 24 may be arranged at the housing structure 12 outside the cavity 14.

According to an embodiment, at least one of the inertial detection sensors 24 may be arranged at the housing structure 12 on the first main surface region 12-2A of the substrate 12-2 (within or outside the cavity 14). Additionally or alternatively, at least one of the inertial detection sensors 24 may be arranged at the housing structure 12 on the second main surface region 12-2B of the substrate 12-2 (outside the cavity 14).

According to an embodiment, at least one of the inertial detection sensors 24 may be arranged at the housing structure 12 on the first main surface region 12-1A of the lid 12-1 (within or outside the cavity 14). Additionally or alternatively, at least one of the inertial detection sensors 24 may be arranged at the housing structure 12 on the second main surface region 12-1B of the lid 12-2 (outside the cavity 14).

In this configuration, the fluid sensor 10 of FIGS. 1-2 can be used as an open-PAS system.

Figure 3:
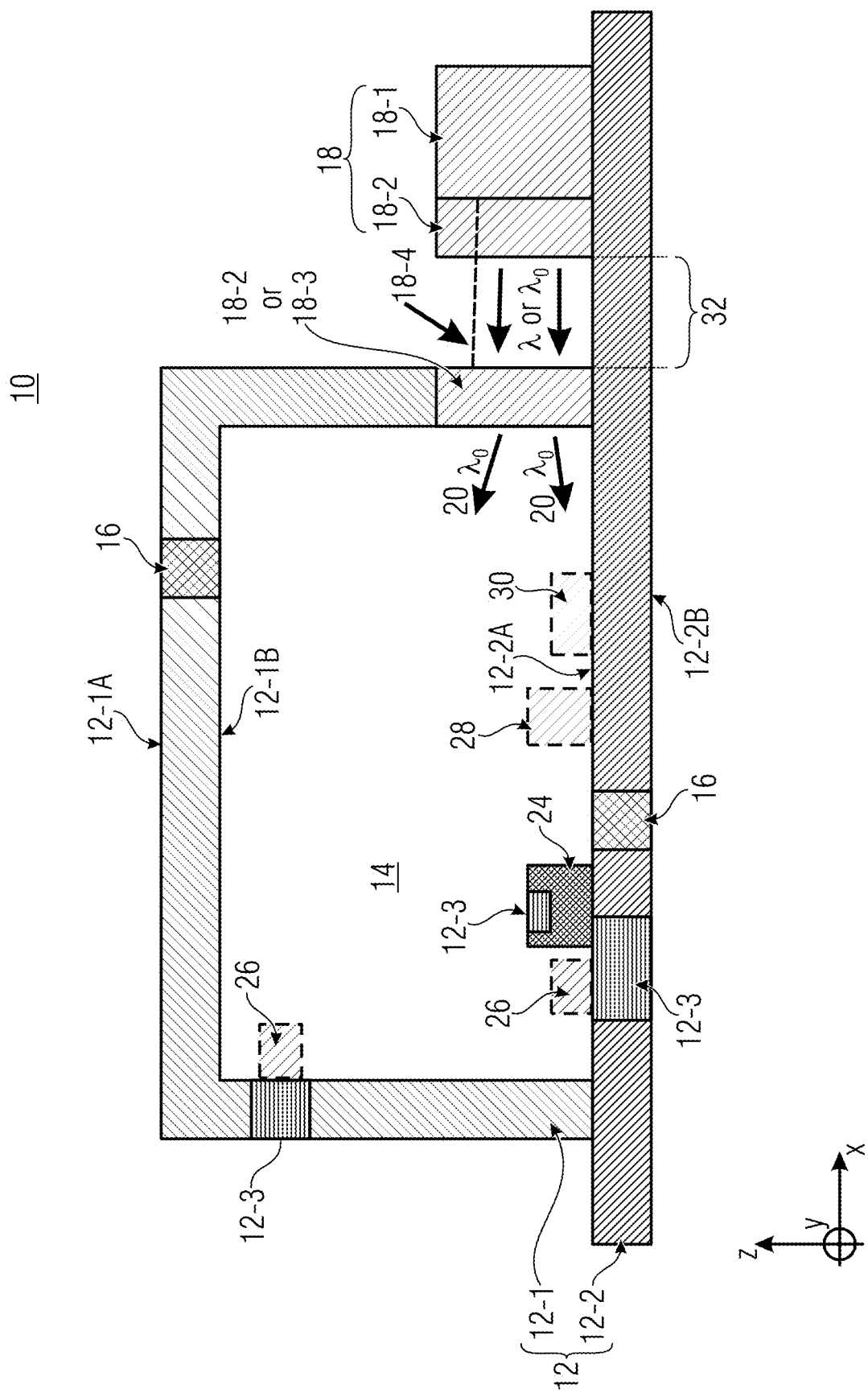
FIG. 3 shows a schematic cross-sectional view of a fluid sensor according to a further embodiment.
Figure 4:
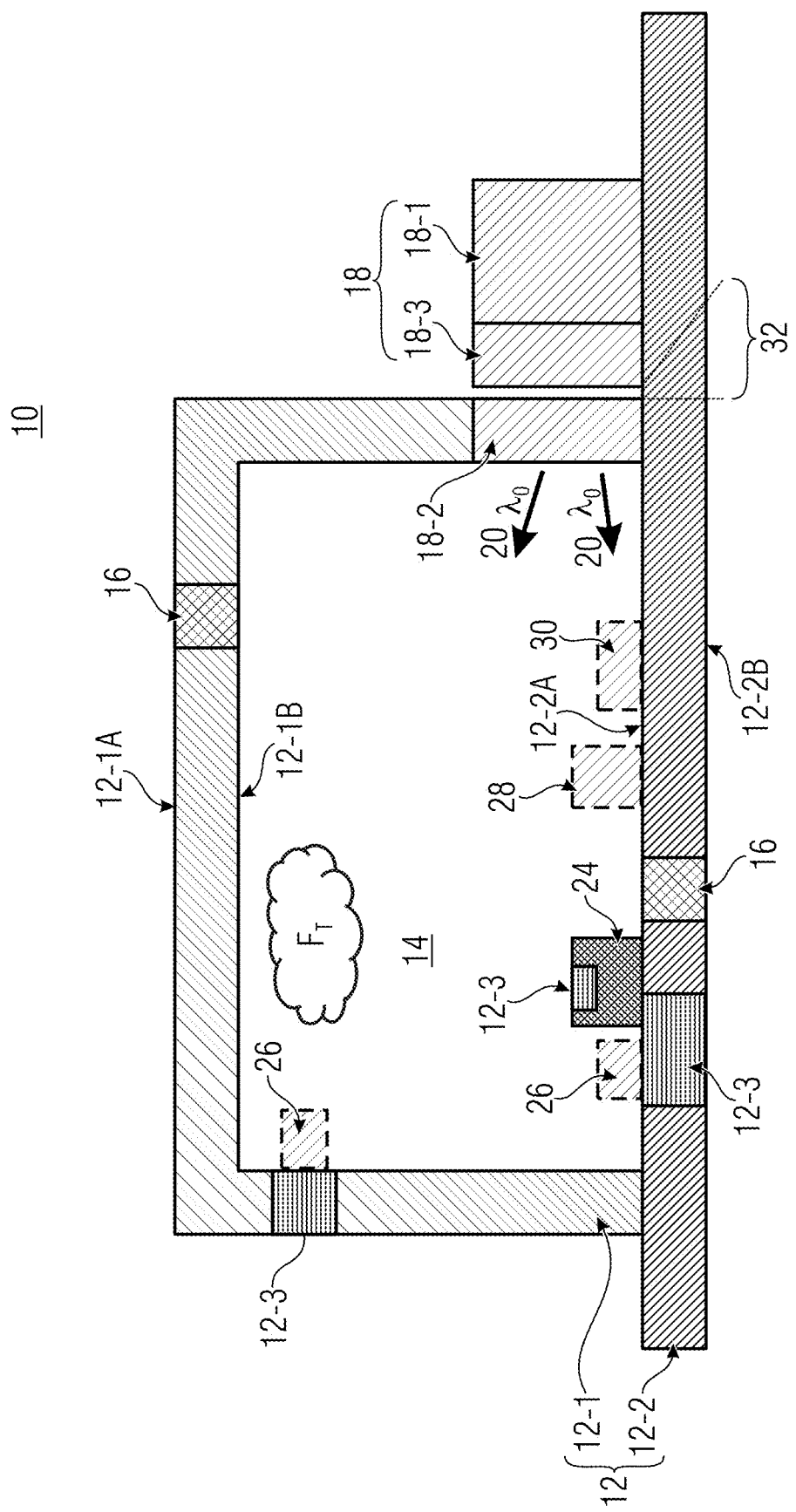
FIG. 4 shows a schematic cross-sectional view of a fluid sensor according to a further embodiment.

FIGS. 3 and 4 show a schematic cross-sectional view of a fluid sensor 10 according to a further embodiment. The arrangement of the fluid sensor 10 of FIGS. 3 and 4 differs from the arrangement of the fluid sensor 10 of FIGS. 1 and 2 in that the emitter structure 18 of the fluid sensor 10 is placed outside the cavity 14. The above evaluations in connection to FIGS. 1 and 2, which relate to the structure and functionality of the further elements of the fluid sensor 10, are equally applicable to the fluid sensor 10 as described below. To be more specific, the IR emitter 18 is configured for emitting or coupling the IR radiation or IR radiation pulses 20, which effect the mechanical pulse(s) 22 in the housing structure or in the inertial detection sensor 24, into the cavity 14 optionally via a window 18-3 or a wave-guide 18-4 and is placed outside of the cavity 14.

The emitter structure 18 may also comprise a thermal source and/or an infrared source 18-1 and, optionally, a wavelength selective structure 18-2 configured for filtering a broadband IR radiation $\lambda$ emitted by the thermal emitter 18-1 and for emitting the narrowband IR radiation 20, e.g. the IR radiation pulse(s) 20, having the center wavelength $\lambda_0$ into the cavity 14.

The wavelength selective structure 18-2 may be arranged at the infrared source 18-1 wherein the narrowband IR radiation 20 is coupled via the IR radiation transparent window 18-3 into the cavity 14. Alternatively or additionally to wavelength selective structure 18-2, the window 18-3 may provide an IR wavelength selectivity for filtering the broadband IR radiation $\lambda$ emitted by the thermal emitter 18-1 so that the window 18-3 may form the wavelength selective structure 18-2 or may be part of the wavelength selective structure 18-2. Thus, at least one of the wavelength selective structure 18-2 (if present at the thermal emitter 18-1) and the window 18-3 provides the optical filter functionality of filtering a broadband IR radiation $\lambda$ emitted by the thermal emitter 18-1 and of providing/coupling the narrowband IR radiation 20 into the cavity 14.

According to an embodiment, the gap 32 may be designed to be (relatively) small, e.g. as small as possible, e.g. between 0 and 10 µm wide or between 6 and 8 µm wide, in order to create the interaction path P dominantly within the cavity 14 for providing the interaction of the IR radiation with the target fluid $F_T$ in the cavity 14, which results in a temperature change in the cavity 14, in the housing structure 12 and/or in the inertial detection sensor 24. Thus, a more dominant IR radiation absorption is created within the cavity 14 rather than in the gap 32.

In this configuration, the fluid sensor 10 of FIGS. 3-4 can be used as an open-PAS system. Any radiation absorption in the cavity 14 will increase the temperature and hence can be measured by pressure changes and vibrations (see above: the primary and secondary effect).

According to a further embodiment, the gap 32 may be designed to be (relatively) large, e.g. between 20 µm and 50 mm wide, between 20 µm and 30 mm or between 20 µm and 10 mm, in order to create the interaction/absorption path P between the thermal emitter 18 and the window 32. A large gap 32 provides, for example, in an NDIR based system (closed configuration) a high resolution due to a large absorption path. Then, the interaction of the IR radiation with the target fluid $F_T$ within the cavity 14 results in a temperature change in the cavity 14, in the housing structure 12 and/or in the inertial detection sensor 24. Thus, the radiation receiving region 12-3 is arranged inside the cavity 14 and in or on the lid 12-1, in or on the substrate 12-2, and/or in or on the inertial detection sensor 24. The temperature change or thermal pulse in the radiation receiving region 12-3 is inversely proportional to the absorption of the IR radiation 20 by the target fluid $F_T$ (see above: the secondary effect).

FIG. 4 shows a configuration of the fluid sensor 10, wherein the gap 32 is substantially reduced or removed. In case, the gap 32 is completely omitted, the window 18-3 may form the wavelength selective structure 18-2, wherein the emitter structure 18 may be directly arranged at and/or mechanically coupled to the housing structure 12, e.g. the lid 12-1.

The arrangement of the emitter structure 18 in FIGS. 3 and 4 also ensures that the radiation, which is coupled into the cavity 14, is the narrowband IR radiation 20 having the center wavelength $\lambda_0$.

Figure 5:
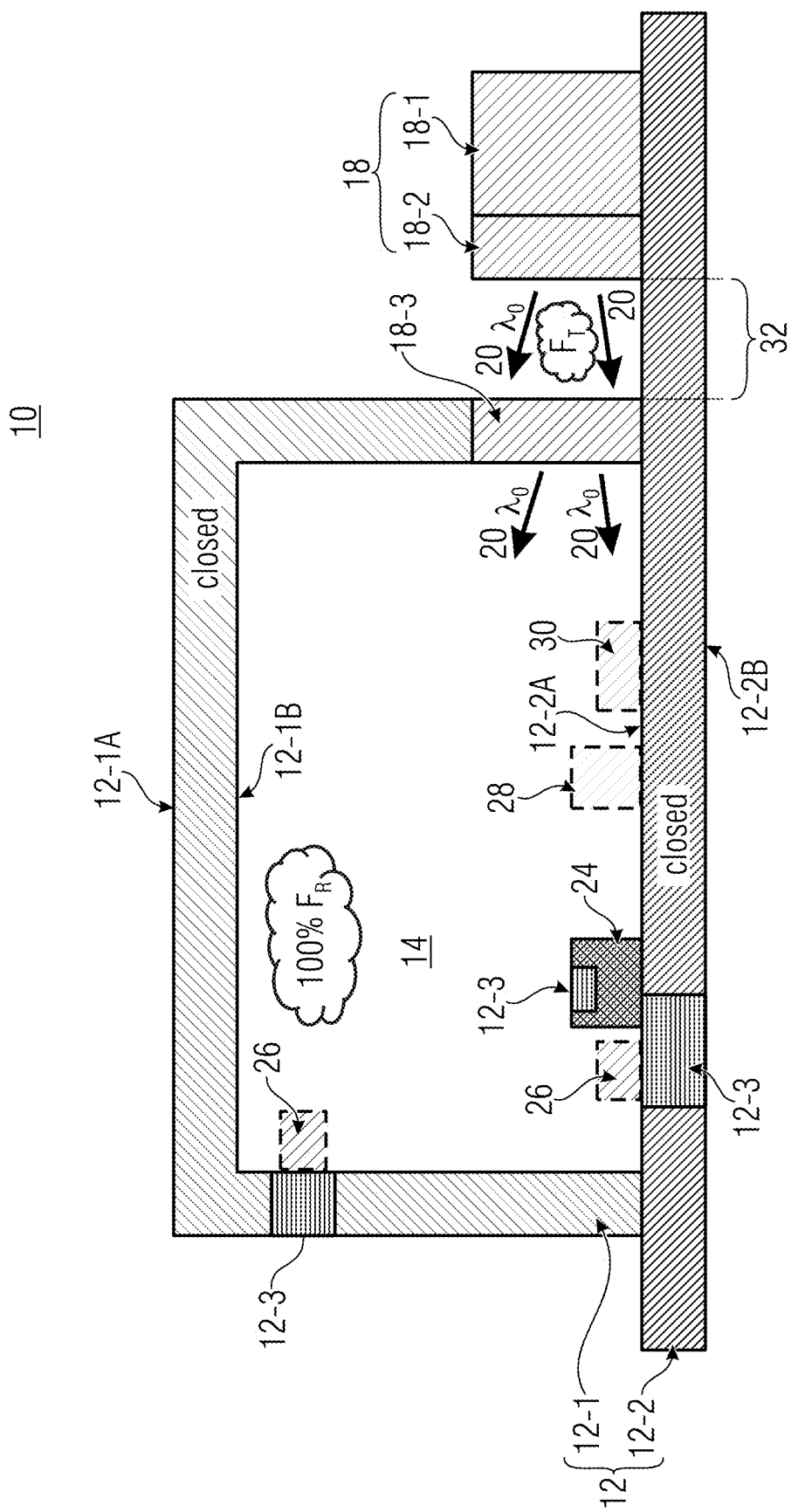
FIG. 5 shows a schematic cross-sectional view of a fluid sensor according to a further embodiment.

FIG. 5 shows a schematic cross-sectional view of a fluid sensor 10 according to a further embodiment. The arrangement of the fluid sensor 10 of FIG. 5 differs from the arrangement of the fluid sensor 10 of FIGS. 3 and 4 in that the cavity 14 in the housing structure 12 is hermetically closed and comprises a reference fluid component FR. As shown in FIG. 5, the IR emitter 18 is arranged outside the cavity 14 and is optically coupled to the cavity 14 for emitting the IR radiation 20 in the cavity 14.

According to an embodiment, the fluid sensor 10 comprises a housing structure (or package) 12. The housing structure 12 forms a cavity 14. The fluid sensor 10 further comprises an IR emitter 18 optically coupled to the housing structure 12 and configured for emitting an IR radiation 20 in the cavity 14, wherein the IR radiation 20 has a center wavelength $\lambda_0$ for providing an interaction of the IR radiation 20 with a target fluid $F_T$ resulting in a temperature change $\Delta T$ in the cavity 14 or in the housing structure 12 which effects a mechanical pulse 22 in the housing structure 12. The fluid sensor 10 further comprises an inertial detection sensor 24 mechanically coupled to the housing structure 12 for sensing the mechanical pulse in the housing structure 12.

The wavelength selective structure 18-2 is arranged at the infrared source 18-1 wherein the narrowband IR radiation 20 is coupled via the IR radiation transparent window 18-3 into the cavity 14. In this configuration, the fluid sensor 10 of FIG. 5 can be used as a closed PAS system with the interaction path P at least partially outside the cavity 14.

According to an embodiment, the gap 32 may be designed to be (relatively) large, e.g. 20 μm to 5 mm wide, in order to create the interaction/absorption path P between the thermal emitter 18 and the window 32 4 for providing the interaction of the IR radiation 20 with the target fluid $F_T$ in the environmental atmosphere $F_E$.

The cavity 14 is hermetically closed and filled with the reference fluid component $F_R$, wherein the reference fluid component $F_R$ absorbs the remaining IR radiation 20 entering the cavity 14 and provides for the local heating and/or the resulting thermal pulse(s) 22 of the housing structure 12 or of a part of the inertial detection sensor 24. The local heating and/or the resulting thermal pulse(s) 22 is a measure of the concentration the target fluid $F_T$ in the environmental fluid $F_E$, and is inversely proportional to the absorption of the IR radiation 20 by the target fluid $F_T$ in the environmental atmosphere $F_E$.

To be more specific, the higher the concentration of the target fluid $F_T$ is in the environmental atmosphere $F_E$, the lower is the amount of IR radiation 20, which reaches the cavity 14 due to the amount of IR radiation absorption by the target fluid $F_T$, and the lower is the local heating and/or the resulting thermal pulse(s) 22 of the housing structure 12 or of a part of the inertial detection sensor 24.

The interaction of the IR radiation 20 with the target fluid $F_T$ is an absorption of the IR radiation 20 by the target fluid $F_T$ in the environmental atmosphere $F_E$, and wherein the absorption of the IR radiation 20 by the reference fluid $F_R$ results in the temperature change $\Delta T$ of the reference fluid $F_R$ and, consequently, in a pressure change $\Delta P$ in the cavity 14, which effects the mechanical pulse(s) 22 in the housing structure 12.

In other words, the fluid sensor or detector 10 is filled with the reference gas (fluid) $F_R$ and the propagation path P from the IR emitter 18 to the detector 10 is the measurement path. In case there is no concentration of the target gas (fluid) $F_T$ in the absorption path, the maximum amplitude of the mechanical pulse(s) 22 in the housing structure 12 would be sensed, since the maximum amplitude of IR radiation 20 can enter the cavity 14. If the environmental concentration of the target gas $F_T$ increases, the absorption in this path increases as well, and as a result the detector 10 will receive a smaller increase in temperature T due to missing energy for absorption. For providing an as accurate as possible operation of the detector 10 during lifetime, the access hole(s) or perforation(s) 16 are removed and the cavity 14 is hermetically tight.

According to an embodiment based on the first (=primary) measurement effect, the reference fluid component $F_R$ is the target fluid $F_T$, i.e. the sealed cavity 14 is filled with the target fluid $F_T$.

Moreover, the interaction of the IR radiation 20 with the target fluid $F_T$ in the environmental atmosphere $F_E$ may result in a temperature change $\Delta T$ of at least a part 12-3 of the housing structure 12 or a part of the inertial detection sensor 24 which effects the mechanical pulse 22 in the housing structure 12 or in the inertial detection sensor 24, respectively. The radiation receiving region 12-3 is arranged inside the cavity 14 and in or on the lid 12-1, in or on the substrate 12-2, and/or in or on the inertial detection sensor 24. The local heating of the radiation receiving portion 12-3 of the housing structure 12 or of the inertial detection sensor 24 is inversely proportional to the absorption of the IR radiation 20 by the target fluid $F_T$ in the environmental atmosphere $F_E$. The heating of the radiation receiving portion 12-3 by the IR radiation 20 is reduced by the amount of IR radiation absorption of the target fluid $F_T$ in the environmental atmosphere $F_E$.

According to an embodiment based on the second (=secondary) measurement effect, the reference fluid component $F_R$ is a fluid component, which is not or very low absorptive for the IR radiation 20 entering the cavity 14.

According to the embodiments of the fluid sensor 10 as described with respect to FIGS. 1 to 5, a (radiation receiving) part 12-3 of the housing structure 12 effects the mechanical pulse 22 in the housing structure 12 or, additionally or alternatively, a (radiation receiving) part 12-3 of the inertial detection sensor 24 effects the mechanical pulse 22 in the inertial detection sensor 24. Thus, the above evaluations in connection to FIGS. 1 to 5, which relate to the structure and functionality of the fluid sensor 10, are equally applicable to the fluid sensor 10 as described below, i.e. the following implementation of the fluid sensor 10 is compatible with the (optional) features of the other implementations as described above.

Thus, according to an embodiment, the fluid sensor 10 may comprise the housing structure 12 forming the cavity 14, the inertial detection sensor 24, wherein a part of the inertial detection sensor 24 forms a radiation receiving section 12-3, and the IR emitter 18. The IR emitter 18 is optically coupled to the housing structure (12) and configured for emitting an IR radiation 20 in the cavity 14, wherein the IR radiation 20 has a center wavelength $\lambda_0$ for providing an interaction of the IR radiation 20 with a target fluid $F_T$. The interaction results in a temperature change $\Delta T$ in the radiation receiving section 12-3 of the inertial detection sensor 24. The temperature change $\Delta T$ in the radiation receiving section 12-3 effects a mechanical pulse 22 in the inertial detection sensor 24, wherein the inertial detection sensor 24 is arranged for sensing the mechanical pulse.

According to an embodiment, the interaction of the IR radiation 20 with the target fluid $F_T$ is an absorption of the IR radiation 20 by the target fluid, which results in the temperature change in the radiation receiving section 12-3 of the inertial detection sensor 24, wherein a heating of the he radiation receiving section 12-3 of the inertial detection sensor 24 is inversely proportional to the absorption of the IR radiation 20 by the target fluid $F_T$.

According to an embodiment, the inertial detection sensor 24 comprises an accelerometer configured to provide a detector output signal $S_{OUT1}$ based on an amplitude of the mechanical pulse 20 in the radiation receiving section 12-3 of the inertial detection sensor 24.

Additional embodiments and aspects are described which may be used alone or in combination with the features and functionalities described herein.

According to an embodiment, a fluid sensor comprises a housing structure forming a cavity for a target fluid component, an IR emitter configured for emitting an IR radiation in the cavity, wherein the IR radiation has a center wavelength for providing an interaction of the IR radiation with the target fluid resulting in a temperature change in the cavity or in the housing structure which effects a mechanical pulse in the housing structure, and an inertial detection sensor mechanically coupled to the housing structure for sensing the mechanical pulse in the housing structure.

According to an embodiment, the interaction of the IR radiation with the target fluid is an absorption of the IR radiation by the target fluid, and wherein the absorption of the IR radiation by the target fluid results in the temperature change of the target fluid and consequently in a pressure change in the cavity, which effects the mechanical pulse in the housing structure.

According to an embodiment, the interaction of the IR radiation with the target fluid is an absorption of the IR radiation by the target fluid, which results in the temperature change or thermal pulse in the housing structure, wherein a heating of the housing structure is inversely proportional to the absorption of the IR radiation by the target fluid.

According to an embodiment, the heating of the housing structure by the IR radiation is reduced by the amount of IR radiation absorption of the target fluid.

According to an embodiment, the housing structure comprises a mechanical pulse amplification structure for providing a mechanical amplification of the mechanical pulse in the housing structure, wherein the amplification of the mechanical pulse depends on the temperature change of the housing structure or the region of the housing structure, which is thermally coupled to the mechanical vibration amplification structure.

According to an embodiment, the inertial detection sensor comprises an accelerometer configured to provide a detector output signal based on an amplitude of the mechanical pulse of the housing structure which is received by the inertial detection sensor mechanically coupled to the housing structure.

According to an embodiment, the accelerometer comprises a piezo-electrical sensor structure and/or a capacitive sensor structure for sensing the mechanical pulse in the housing structure.

According to an embodiment, the inertial detection sensor comprises a suspended mechanical sensor structure which has a mechanical resonance frequency in the range between 5 Hz and 25 kHz or between 5 Hz and 100 Hz.

According to an embodiment, the housing structure comprises a lid structure which is mechanically coupled to a substrate or basis element, wherein the inertial detection sensor is mechanically coupled to the lid structure or the substrate.

According to an embodiment, the fluid sensor further comprises a plurality of inertial detection sensors which are mechanically coupled to the housing structure for sensing the mechanical pulse in the housing structure.

According to an embodiment, at least one of the plurality of inertial detection sensors is arranged at the housing structure within the cavity or at least one of the plurality of inertial detection sensors is arranged at the housing structure outside to the cavity.

According to an embodiment, the IR emitter is arranged in the cavity or is optically coupled to the cavity.

According to an embodiment, the IR emitter comprises an LED element, a laser element and/or a thermal emitter element.

According to an embodiment, the IR emitter comprises an infrared source and a wavelength selective structure for providing the IR radiation pulse having the center wavelength.

According to an embodiment, the wavelength selective structure is arranged for filtering a broadband IR radiation emitted by the thermal emitter and for emitting narrowband IR radiation into the cavity.

According to an embodiment, the cavity in the housing structure is arranged for providing an optical interaction path of the IR radiation for an interaction with the target fluid.

According to an embodiment, the fluid sensor further comprises a differential pressure sensor arranged in the cavity of the housing structure to provide a further detector output signal based on the pressure change generated in the cavity of the housing structure by means of the IR radiation.

According to an embodiment, the fluid sensor further comprises a processing circuit or controller for providing a time varying or pulsed excitation signal to the IR emitter and for reading out the inertial detection sensor for providing a fluid sensor output signal providing an information on the concentration of the target fluid component in the environmental fluid.

According to an embodiment, the housing structure comprises a fluid access to the cavity for an environmental fluid comprising a target fluid component.

According to an embodiment, the cavity in the housing structure is hermetically closed and comprises the target fluid component.

According to an embodiment, a part of the lid and/or of the substrate and/or a part of the inertial detection sensor forms a radiation receiving section arranged such that a temperature change ΔT in the radiation receiving section effects the mechanical pulse(s).

According to an embodiment, a fluid sensor comprises a housing structure forming a cavity, an inertial detection sensor, wherein a part of the inertial detection sensor forms a radiation receiving section, and an IR emitter optically coupled to the housing structure and configured for emitting an IR radiation in the cavity, wherein the IR radiation has a center wavelength $\lambda_0$ for providing an interaction of the IR radiation with a target fluid resulting in a temperature change in the radiation receiving section of the inertial detection sensor, which effects a mechanical pulse in the inertial detection sensor, wherein the inertial detection sensor is arranged for sensing the mechanical pulse.

According to an embodiment, the interaction of the IR radiation with the target fluid $F_T$ is an absorption of the IR radiation by the target fluid, which results in the temperature change in the radiation receiving section of the inertial detection sensor, wherein a heating of the he radiation receiving section of the inertial detection sensor is inversely proportional to the absorption of the IR radiation by the target fluid.

According to an embodiment, the inertial detection sensor comprises an accelerometer configured to provide a detector output signal based on an amplitude of the mechanical pulse in the radiation receiving section of the inertial detection sensor.

Although some aspects have been described as features in the context of an apparatus it is clear that such a description may also be regarded as a description of corresponding features of a method. Although some aspects have been described as features in the con-text of a method, it is clear that such a description may also be regarded as a description of corresponding features concerning the functionality of an apparatus.

In the foregoing detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A fluid sensor, comprising:
   a housing structure forming a cavity,
   an IR emitter optically coupled to the housing structure and configured for emitting an IR radiation in the cavity, wherein the IR radiation has a center wavelength for providing an interaction of the IR radiation with a target fluid resulting in a temperature change in the cavity or in the housing structure which effects a mechanical pulse in the housing structure, and
   an inertial detection sensor mechanically coupled to the housing structure for sensing the mechanical pulse in the housing structure,
   wherein a part of the lid and/or of the substrate and/or a part of the inertial detection sensor forms a radiation receiving section arranged such that a temperature change $\Delta T$ in the radiation receiving section effects the mechanical pulse.

2. The fluid sensor according to claim 1, wherein the interaction of the IR radiation with the target fluid is an absorption of the IR radiation by the target fluid, and wherein the absorption of the IR radiation by the target fluid results in the temperature change of the target fluid and consequently in a pressure change in the cavity, which effects the mechanical pulse in the housing structure.

3. The fluid sensor according to claim 1, wherein the interaction of the IR radiation with the target fluid is an absorption of the IR radiation by the target fluid, which results in the temperature change in the housing structure, wherein a heating of the housing structure is inversely proportional to the absorption of the IR radiation by the target fluid.

4. The fluid sensor according to claim 3, wherein the heating of the housing structure by the IR radiation is reduced by an amount of IR radiation absorption of the target fluid.

5. The fluid sensor according to claim 1, wherein the housing structure comprises a mechanical pulse amplification structure for providing a mechanical amplification of the mechanical pulse in the housing structure, wherein the amplification of the mechanical pulse depends on the temperature change of the housing structure or a region of the housing structure, which is thermally coupled to the mechanical pulse amplification structure.

6. The fluid sensor according to claim 1, wherein the inertial detection sensor comprises an accelerometer configured to provide a detector output signal based on an amplitude of the mechanical pulse of the housing structure which is received by the inertial detection sensor mechanically coupled to the housing structure.

7. The fluid sensor according to claim 6, wherein the accelerometer comprises a piezo-electrical sensor structure and/or a capacitive sensor structure for sensing the mechanical pulse in the housing structure.

8. The fluid sensor according to claim 1, wherein the inertial detection sensor comprises a suspended mechanical sensor structure which has a mechanical resonance frequency in the range between 5 Hz and 25 kHz, in particular between 5 Hz and 100 Hz.

9. The fluid sensor according to claim 1, wherein the housing structure comprises a lid structure which is mechanically coupled to a substrate, wherein the inertial detection sensor is mechanically coupled to the lid structure or the substrate.

10. The fluid sensor according to claim 1, further comprising:
    a plurality of inertial detection sensors which are mechanically coupled to the housing structure for sensing the mechanical pulse in the housing structure.

11. The fluid sensor according to claim 10, wherein at least one of the plurality of inertial detection sensors is arranged at the housing structure within the cavity or at least one of the plurality of inertial detection sensors is arranged at the housing structure outside to the cavity.

12. The fluid sensor according to claim 10, wherein at least one of the plurality of inertial detection sensors is arranged at the housing structure within the cavity and at least one of the plurality of inertial detection sensors is arranged at the housing structure outside to the cavity.

13. The fluid sensor according to claim 1, further comprising:
a differential pressure sensor arranged in the cavity of the housing structure to provide a further detector output signal based on the pressure change generated in the cavity of the housing structure by means of the IR radiation.

14. The fluid sensor according to claim 1, further comprising:
a processing circuit for providing a time varying or pulsed excitation signal to the IR emitter and for reading out the inertial detection sensor for providing a fluid sensor output signal providing an information on a concentration of a target fluid component in an environmental fluid.

15. The fluid sensor according to claim 1, wherein the housing structure comprises a fluid access to the cavity for an environmental fluid comprising a target fluid component.

16. The fluid sensor according to claim 1, wherein the cavity in the housing structure is hermetically closed and comprises a target fluid component.

17. A fluid sensor, comprising:
a housing structure forming a cavity,
an inertial detection sensor, wherein a part of the inertial detection sensor forms a radiation receiving section, and
an IR emitter optically coupled to the housing structure and configured for emitting an IR radiation in the cavity, wherein the IR radiation has a center wavelength for providing an interaction of the IR radiation with a target fluid resulting in a temperature change in the radiation receiving section of the inertial detection sensor, which effects a mechanical pulse in the inertial detection sensor,
wherein the inertial detection sensor is arranged for sensing the mechanical pulse.

18. The fluid sensor according to claim 17, wherein the interaction of the IR radiation with the target fluid is an absorption of the IR radiation by the target fluid, which results in the temperature change in the radiation receiving section of the inertial detection sensor, wherein a heating of the radiation receiving section of the inertial detection sensor is inversely proportional to the absorption of the IR radiation by the target fluid.

19. The fluid sensor according to claim 17, wherein the inertial detection sensor comprises an accelerometer configured to provide a detector output signal based on an amplitude of the mechanical pulse in the radiation receiving section of the inertial detection sensor.

* * * * *